April 19, 1960 J. M. BARNOTHY 2,933,608
RADIATION MEASURING DEVICE
Filed Feb. 28, 1957 2 Sheets-Sheet 2

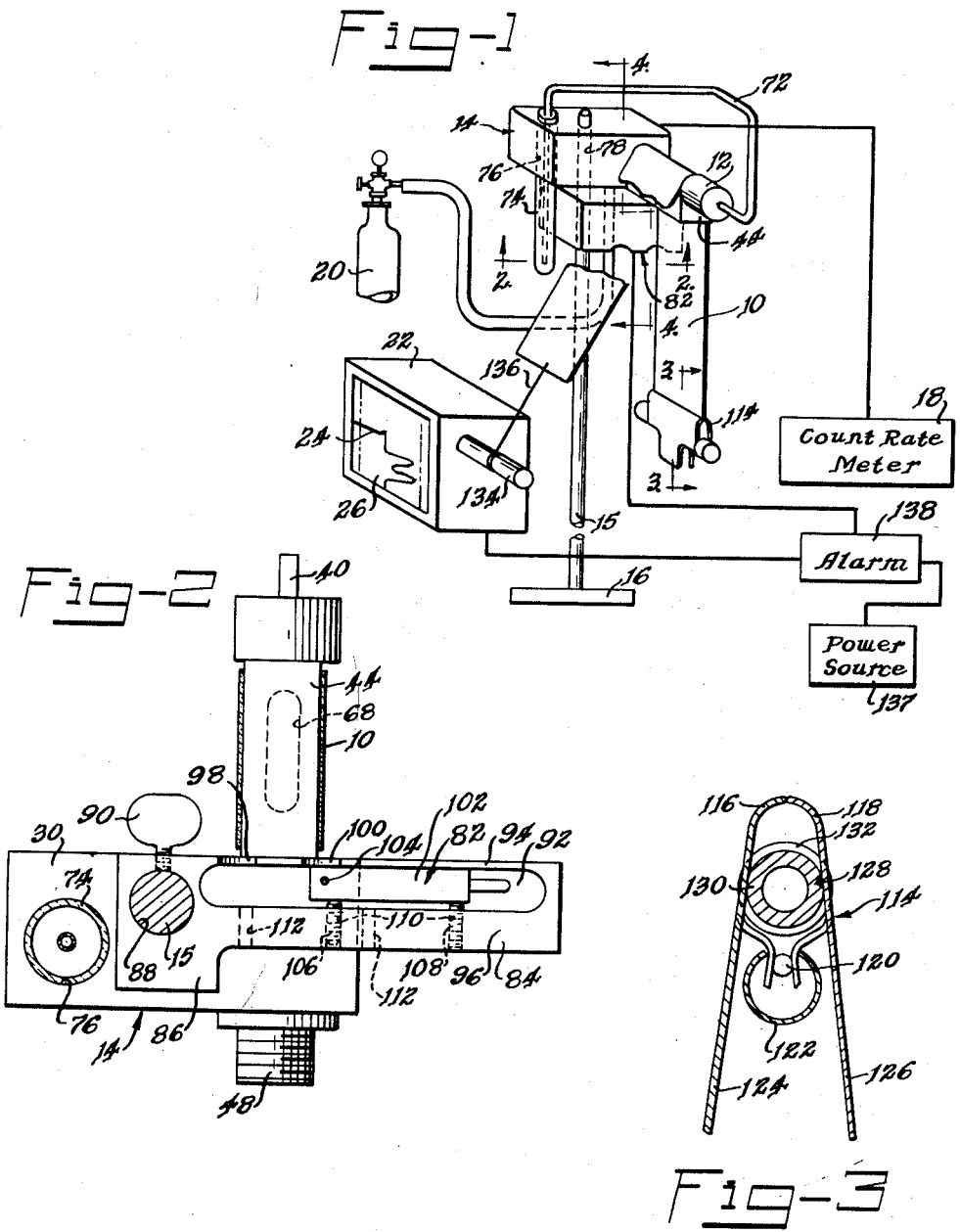

Inventor
Jeno M. Barnothy
By:
Marshall A. Burmeister
Attorneys

United States Patent Office 2,933,608
Patented Apr. 19, 1960

2,933,608

RADIATION MEASURING DEVICE

Jeno M. Barnothy, Evanston, Ill.

Application February 28, 1957, Serial No. 643,158

9 Claims. (Cl. 250—83.3)

The present invention relates to devices for measuring the radiation of an elongated strip, and particularly to automatic means for performing this scanning operation.

Paper chromatography is a well known method of determining the elements of a complex chemical compound. A drop of a solution of the material to be analyzed is placed near the end of a strip of absorbing paper. This end is immersed in a solvent to permit the compound to migrate throughout the paper strip. Since the migration of the elements depends upon their solubility, each element will migrate in a given time characteristic for that element. This method of analysis is further described in "Paper Chromatography" by Dr. Friedrich Cramer, McMillan & Co., Ltd., 1954. Localization of the spot on which one element of the compound accumulates is easy if the element (which itself can be a complex chemical compound) is colored, or can be induced to show a color through proper preparation, or show its fluorescence under ultraviolet light.

A newer method is to tag the components of a complex compound with radioactive isotopes, for example, to exchange some hydrogen atoms in a chemical compound for tritium atoms. Also, some isotopes of the material to be analyzed may be activated through neutron radiation.

The radioactive spots of a chromatograph strip can be located even if they do not show a color or fluorescence, if the strip is scanned with a device sensitive to radioactive emanations. Moreover, not only the location of the spots, but also the quantity of the material deposited in each spot can be obtained by determining the total activity of the spots.

The inventor's patent application entitled "Radiation Measuring Device," Serial No. 584,789, filed May 14, 1956, discloses a device for scanning radioactive strips including a recording galvanometer and means to correlate the position of a radioactive strip with the galvanometer. This device produces very satisfactory results, but requires the attention of an operator, since there is no mechanism disclosed to inactivate the device when the radioactive strip has been fully scanned.

It is often desirable for a single operator to scan a radioactive strip and simultaneously perform other functions. Occasionally, a single operator will scan a plurality of radioactive strips simultaneously. It is therefore highly desirable that the radioactive measuring and scanning equipment be automatically deactivated after the strip has been scanned.

There are devices presently known to the art which will automatically inactivate the radiation measuring and scanning equipment when the end of the strip has been reached, or when the scanning has been completed. However, these devices are correlated with the drive mechanism for pulling the radioactive strip, rather than with the radioactive strip itself. As a result, changes in scanning speed generally require an adjustment of the stop mechanism in order to inactivate the equipment at the proper time. Further, the existing equipment is relatively complicated and costly to construct.

It is therefore one of the objects of the present invention to provide a device for automatically scanning and measuring the radioactivity of an elongated strip which includes a stop mechanism correlated to the position of the strip itself for inactivating the device.

It is also an object of the present invention to provide a switch mechanism which may be used with a scanning device for elongated radioactive strips which is simple in construction, versatile, and relatively inexpensive.

These and additional objects of the present invention will become readily apparent to those skilled in the art from a further reading of this disclosure, particularly when viewed in the light of the drawings, in which:

Figure 1 is an elevational view of a radiation measuring device, partly schematic, constructed according to the teachings of the present invention;

Figure 2 is a sectional view taken along the line 2—2 of Figure 1;

Figure 3 is a sectional view taken along the line 3—3 of Figure 1; and

Figure 4:
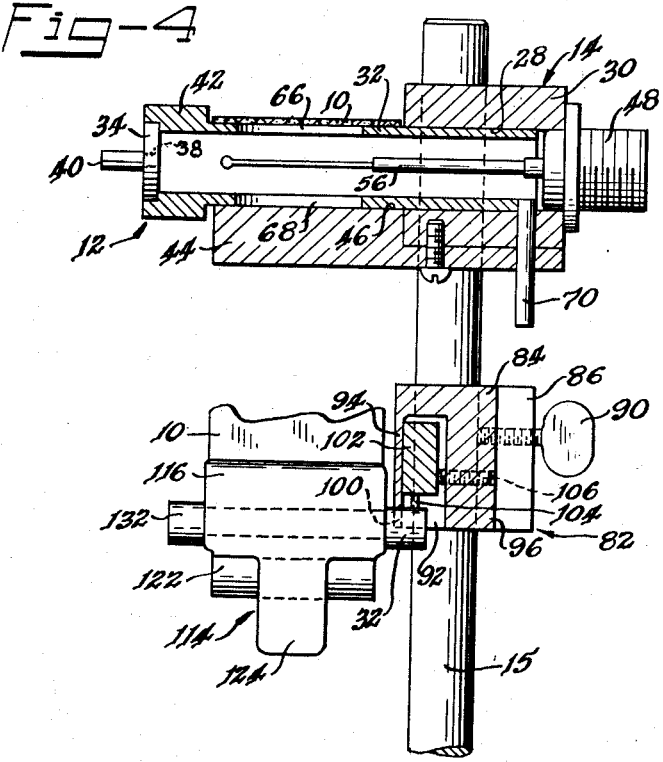
Figure 4 is a sectional view taken along the line 4—4 of Figure 1.

As illustrated in Figure 1, the flexible tape 10 which is to be scanned, generally a porous paper strip, is disposed over the scanning head 12 of a radiation measuring device 14. The radiation measuring device 14 is mounted upon a vertical shaft 15 of a stand 16 and connected to a count rate meter 18. A source of gas 20 is connected to the radiation measuring device 14 to provide a suitable ionizing medium within the counting chamber of the scanner. The count rate meter 18 is connected to a recording galvanometer 22 which has a pen 24 which places a trace upon a paper tape 26.

The scanning head 12 of the radiation measuring device extends horizontally outwardly from a support member 30. The scanning head 12 is formed by a hollow cylindrical tube 32 which forms a snug slidable fit within a channel 28 in the support member 30. The end of the tube 32 disposed within the support member 30 is open, and the end of the tube opposite the support member 30 is closed, for example, by a cover 34 which is sealed within this end of the tube. The cover 34 is provided with a central orifice 38, and a stem 40 extends outwardly from the orifice 38. This end of the tube has a diameter greater than the remainder of the tube forming an outwardly extending flange 42.

The support member 30 is in the form of a rectangular bar disposed normally to the tube 32. A supporting bar 44 is secured underneath the support member 30 adjacent to the channel 28 and extends outwardly from the support member 30 in abutting relation with the tube 32, the bar 44 terminating adjacent to the flange 42. The surface 46 of the bar 44 which abuts the tube 32 has a radius of curvature approximately equal to that of the channel 28, thus conforming to the tube 32.

A coaxial connector 48 is secured to the support member 30 at the end of the channel 28 opposite the scanning head 12, the connector 48 sealing this end of the channel 28. An anode wire 56 extends along the axis of the tube 32 confronting openings 66 and 68 on opposite sides of the tube 32. The openings 66 and 68 are disposed on opposite sides of the tube 32 approximately midway between the support member 30 and the flange 42.

A small tube 70 extends through the support member 44 and support member 30 into the channel 28, and the tube 70 is connected to the source 20 of ionizable gas for the chamber. The gas is permitted to flow through the chamber and outwardly from the stem 40 in the cover 34, and a tube 72 connects the stem 40 to a gas bubbler 74 which is mounted in an aperture 76 in the support member 30. The support member 30 also has a channel 78 which extends therethrough normal to the tube 32 of the scanning head 12, and the shaft 15 of the stand 16 extends through this channel 78 and is secured therein.

A switch assembly 82 is mounted to the shaft 15 immediately below the radiation measuring device 14. The switch assembly 82 has an elongated housing 84 which is generally bar-shaped and has a protruding end 86. A channel 88 extends through the end 86 and accommodates the shaft 15, a set screw 90 being employed to secure the housing 84 to the shaft 15.

The housing 84 is provided with a cavity 92 which extends into the housing 84 from the side thereof remote from the radiation measuring device 14 along an axis paralleling the axis of elongation of the housing 84. The cavity 92 forms a pair of generally parallel walls 94 and 96, the wall 94 being disposed adjacent to the path of the strip 10 and immediately below the juncture of the support member 30 and the tube 32 of the scanning head 12. A pair of indentations 98 and 100 are disposed in the wall 94, the indentation 98 being immediately below one side of the scanning head 12 and the indentation 100 being immediately below the other side of the scanning head 12. A single pole double throw switch 102 with normally closed and normally open contacts is disposed within the cavity 92, and the switch 102 has an actuating member 104 which confronts one of the indentations 98 or 100, the indentation 100 as illustrated. The switch 102 is maintained in position by a pair of set screws 106 and 108 which extend through threaded bores 110 in the wall of the housing 84. The bores 110 are disposed in a plane parallel to the axis of elongation of the housing 84, and the wall 96 is provided with a second pair of threaded bores 112 which are aligned with the first pair and disposed adjacent to the indentation 98 so that the switch 102 may be mounted to position the actuating member 104 to confront the indentation 98 with set screws disposed within the bores 112, rather than bores 110.

A clip 114 which serves as a weight or tension means is attached to the end of the strip 10. The clip 114 is best illustrated in Figure 3. The clip 114 is provided with a pair of jaws 116 and 118 which curve toward and abut each other on one end. At the other end, the jaws 116 and 118 curve toward each other and are pivoted on balls 120. The jaws 116 and 118 are thus curved toward each other on both ends leaving a substantial space between the jaws. A semi-tubular spring 122 engages the jaws 116 and 118 adjacent to the balls 120 to spring bias the jaws 116 and 118 together. A pair of lever arms 124 and 126 extend outwardly from the jaws 116 and 118 to facilitate opening the jaws. A cylindrical rod 128 is disposed in the space between the jaws 116 and 118, the rod having a central portion 130 of smaller diameter than end portions 132. The rod 128 forms a portion of the tension means, and also cooperates with the switch 102, as will be hereinafter described.

The recording galvanometer 22 is provided with a drive mechanism having a shaft 134 which extends outwardly therefrom, the shaft 134 forming a power take-off, and a thread 136 is secured to the shaft and to the end of the strip 10 which is to be scanned opposite the clip 114, thus providing a means for translating the strip 10. The shaft 134 rotates synchronously with translation of the paper tape 26 of the galvanometer, so that the thread 136 translates the strip 10 in synchronism with the motion of the paper tape 26 of the recording galvanometer 22. The recording galvanometer 22 is electrically powered, and is connected to a power source 137 through the normally closed contacts of the switch 102.

The strip 10 which is to be scanned extends from the thread 136 over the recording head 12, and then hangs down due to the weight of the clip 114 and rod 128 at its end opposite the recording galvanometer 22. Relative to the galvanometer 22, the switch 102 is normally closed, except when the actuating member 104 is engaged, therefore, unless the power source 137 is disconnected, the strip 10 is translated by rotation of the shaft 134. As a result, the clip 114 is raised toward the switch assembly 82. One of the protruding portions 132 of the rod 128 confronts and is aligned with the indentation 100, and as the recording galvanometer pulls the clip 114 upward, the protruding portion 132 of the rod 130 nestles into the indentation 100 and abuts the switch actuating member 104 to open the switch 102 with respect to the galvanometer. As a result, the power source 137 is disconnected from the recording galvanometer 22, and the translation means for the strip 10 is deactivated.

An alarm 138 is connected to the power source 137 through the normally open contacts of the switch 102, so that actuation of the switch 102 actuates the alarm 138. The alarm may be of any conventional type, such as an electrically powered bell, buzzer, or light.

As illustrated, the clip 114 and rod 128 serve dual functions, i.e., they form the tension means which retains the strip taut, and they form the means which abuts the actuating member 104 of the switch. This construction is very advantageous because its is low cost, simple, and fool proof. However, the invention may clearly be practiced with a separate tension means and switch abutting means. For example, the switch abutting means can be a clamp which attaches to any part of the strip 10, rather than merely at an end thereof, or some other type of device than the clip 114 could be employed to secure the rod 128 to the strip 10.

From the foregoing disclosure, it is clear that a convenient and simple device has been provided for deactuating the drive mechanism for the strip 10 to be scanned when it has reached the end of its path. Due to the fact that the switch assembly 82 is secured to a common shaft 15 with the radiation measuring device 14, the position of the strip 10 at which the switch is actuated may be adjusted by merely releasing the set screw 90 and moving the switch assembly 82 relative to the radiation measuring device 14. In like manner, the switch may be employed with the powered end of the strip 10 on either side of the scanning head 12.

Those skilled in the art will readily devise many modifications of the device here disclosed within the intended scope of this invention. It is therefore intended that the scope of the invention be not limited by the foregoing disclosure, but rather only by the appended claims.

The invention claimed is:

1. A device for radioactive scanning of an elongated strip comprising, in combination, a radiation measuring device, means for translating the strip along a path extending adjacent to the radiation measuring device including a drive mechanism adapted to be attached to one end of the strip, and a tension device adapted to be attached to the other end of the strip, a switch having an actuating member disposed adjacent to the path of the strip between the tension device and the radiation measuring device and electrically connected to the drive mechanism to control it, and an element adapted to be attached to the strip between the tension device and the radiation measuring device, the strip guiding said element into the switch actuating member.

2. A device for radioactive scanning of an elongated strip comprising, in combination, a radiation measuring device, means for translating the strip along a path extending adjacent to the radiation measuring device including an electrically powered drive mechanism adapted to be attached to one end of the strip, and a weight adapted to be secured to the other end of the strip, a switch having an actuating member disposed adjacent to the path of the strip between the weight and the radiation measuring device and electrically connected to the drive mechanism to control it, and an element adapted to be attached to the end of the strip opposite the drive mechanism and extending outwardly therefrom, the strip guiding said element into the switch actuating member.

3. A device for radioactive scanning of an elongated strip comprising, in combination, a radiation measuring device, means for translating the strip along a path extending adjacent to the radiation measuring device including an electrically powered drive mechanism adapted to be attached to one end of the strip, and a clip adapted to be secured to the other end of the strip having a pair of spring biased jaws pivotally mounted at one end and engaging at the other end, said jaws being spaced from each other except at their engaging ends, a switch having an actuating member disposed adjacent to the path of the strip between the clip and the radiation measuring device and electrically connected to the drive mechanism to control it, and a rod disposed between the jaws of the clip and protruding therefrom, the strip guiding the protruding portion of said rod into the switch actuating member.

4. A device for radioactive scanning of an elongated strip comprising, in combination, a radiation measuring device, means for translating the strip along a path extending adjacent to the radiation measuring device including an electrically powered drive mechanism adapted to be attached to one end of the strip, and a clip adapted to be secured to the other end of the strip having a pair of spring biased jaws pivotally mounted at one end and engaging at the other end, said jaws being spaced from each other except at their engaging ends, a rod disposed between the jaws of the clip and protruding therefrom, the strip guiding the protruding portion of said rod into the switch actuating member, and a switch assembly having a housing mounted to the radiation measuring means adjacent to the path of the strip between the clip and the radiation measuring device, said housing having a cavity therein and an indentation therein between the cavity and the path of the strip adapted to accommodate the protruding portion of the rod, and an electrical switch disposed in the cavity having an actuating member disposed adjacent to the indentation in the housing.

5. A device for radioactive scanning of an elongated strip comprising, in combination, a radiation measuring device having a housing with a channel extending therethrough and a scanning head extending outwardly therefrom, a vertical shaft secured within the channel for mounting the radiation measuring device, a drive mechanism adapted to be attached to one end of the strip and a clip adapted to be attached to the other end of the strip having a pair of spring biased jaws pivotally mounted at one end and engaging at the other end, said jaws being spaced from each other except at their engaging ends, and the strip extending over the scanning head, a switch assembly having a housing with a channel therethrough disposed below the radiation measuring device, said housing having a cavity with a wall disposed adjacent to the path of the strip and normal thereto with an indentation aligned with the path of the strip, and a switch disposed within the cavity having an actuating member adjacent to the indentation, and a rod disposed between the jaws of the clip and protruding therefrom, the strip guiding the protruding portion of said rod into the switch actuating member.

6. A switch assembly comprising an elongated housing having a channel extending therethrough normal to the axis of elongation, said housing having a pair of spaced walls forming an elongated cavity generally parallel to the channel and the axis of elongation of the housing, one of the walls of said housing having an indentation therein, and a switch disposed within the cavity having an actuating member confronting the indentation.

7. A switch assembly comprising an elongated housing having a channel extending therethrough normal to the axis of elongation, said housing having a pair of spaced walls forming an elongated cavity generally parallel to the channel and the axis of elongation of the housing, one of said walls of the housing having a pair of spaced indentations therein, and the other of said walls having a plurality of spaced threaded bores extending therethrough in a plane generally parallel to the axis of elongation of the housing, and a switch disposed within the cavity having an actuating member confronting one of the indentations, said switch being secured within the cavity by a pair of screws threaded within two of the bores in the housing and abutting the switch, said switch being mountable with its actuating member confronting either of the indentations.

8. A device for measuring the radioactivity of an elongated strip comprising a counter, a recording galvanometer having a recording strip and a driving mechanism coupled thereto, said recording galvanometer also being provided with a power takeoff mechanically coupled to the driving mechanism and synchronized with the motion of the recording strip, a count rate meter connected to the counter and electrically coupled to the recording galvanometer, means for translating the elongated strip along a path extending adjacent to the counter including means for mechanically coupling the elongated strip to the power takeoff, whereby translation of the elongated strip is synchronized with movement of the recording strip.

9. A radiation measuring device comprising the elements of claim 8 wherein the means for translating the elongated strip includes a drive wheel coupled to the power takeoff of the recording galvanometer, a thread fastened at one end to the drive wheel and adapted to be connected at the other end to one end of the elongated strip, and means adapted to be attached to the other end of the elongated strip to yieldably resist movement of the elongated strip.

References Cited in the file of this patent

UNITED STATES PATENTS

| 2,433,444 | Eichinger | Dec. 20, 1947 |
| 2,649,517 | Egan | Aug. 18, 1953 |
| 2,751,505 | Anderson | June 19, 1956 |

OTHER REFERENCES

"Monitor Measures Air and Surface Contamination," by Watts et al., from Nucleonics, vol. 13, No. 1, January 1955, pages 51 and 52.